United States Patent [19]

Isayama et al.

[11] 3,971,751

[45] July 27, 1976

[54] VULCANIZABLE SILYLETHER TERMINATED POLYMER

[75] Inventors: Katsuhiko Isayama; Itaru Hatano, both of Kobe, Japan

[73] Assignee: Kanegafuchi Kagaku Kogyo Kabushiki Kaisha, Osaka, Japan

[22] Filed: June 9, 1975

[21] Appl. No.: 584,827

[52] U.S. Cl................................ 260/37 R; 260/2 S; 260/18 S; 260/30.6 SB; 260/31.8 R; 260/37 AL; 260/448.2 B; 526/11.1
[51] Int. Cl.².................... C08L 83/00; C08L 71/00
[58] Field of Search........... 260/37 AL, 2 S, 67 UA, 260/67 UC, 448.2 B

[56] References Cited
UNITED STATES PATENTS
3,159,662   12/1964   Ashby............................. 260/2 S X Primary Examiner—Lewis T. Jacobs
Attorney, Agent, or Firm—Moonray Kojima

[57] ABSTRACT

A composition comprising a polyether having silicon end group, which composition is changeable to a rubber-like substance upon exposure to atmospheric moisture at room temperature.

20 Claims, No Drawings

VULCANIZABLE SILYLETHER TERMINATED POLYMER

BACKGROUND OF THE INVENTION

This invention relates to a polyether having silicon end group, and a composition comprising said polyether, which is changeable to a rubber-like substance upon exposure to atmospheric moisture at room temperature and which is useable as a sealing materail or adhesive.

In the prior art, there are both two component type and single component type of sealing or adhesive material which can vulcanize at room temperature.

Some examples of the two component type of sealing or adhesive material are chemical compounds of the thiokol series, urethane series, etc. In such two component systems, it is necessary to mix a main component and a vulcanizer prior to use. This leads to many disadvantages, such as the same adhesive properties are not always reproducible since method of mixing, and mixing conditions are rarely reproducible. Thus, the entire amount of the mixed material must be used promptly. In order to overcome these disadvantages, sealing materials of the single component type have been developed.

One example of sealing materials of the single component type is a polymeric substance having isocyanate end group. However, although some of the problems arising from use of two component type of sealing material are resolved, there are still many unsolved problems with the single component type. For example, although the polymer having isocyanate end group has an advantage in that it vulcanizes upon contact with the atmospheric moisture at room temperature, it has many disadvantages, such as it bubbles upon vulcanization due to carbon dioxide being generated and consequently, poor adhesive properties of the resulting polymer are produced. Moreover, it cannot be used as a sealing material at temperatures higher than 80°C since the thermal stability of the resulting polymer is poor. Also, its vulcanizing velocity is relatively slow.

Another example of a single component sealing material is polysiloxane having silicon end group provided with one or more hydrosyzable groups. The polymer is able to vulcanize rapidly by contact with atmospheric moisture without producing any undesirable phenomenon, such as bubbling caused by generation of gaseous reaction products. Moreover, the adhesive property and the thermal stability of the resulting polymer are excellent. However, since the polymer consists of a special kind of main chain as polysiloxane in its molecular structure, a large commercial disadvantage arises from its high cost. Accordingly, work has been done to obtainpolymers whose main chains do not consist of polysiloxane and instead consists of organic polymer of low cost and having silicon end group only at each end of the molecular chain and wherein silicon atom has at least one hydrolizable group.

In order to obtain such organic polymers having silicon end group provided with hydrolyzable groups, the following two methods have been proposed for synthesizing same; namely, Method "A" as set forth in U.S. Pat. No. 3,592,795 and 3,408,321 and Method "B" as set forth in U.S. Pat. No. 3,632,557.

A method B, a polymer having hydroxyl end group such as polyether polyol or polyester polyol is used as a starting material for synthesis. First, a polymer having two isocyanate end groups connecting to each chain end with at least two urethane linkages in a molecule, is synthesized by the reaction of the polymer having hydroxyl end group with isocyanate compound such as toluene, diisocyanate. Then, an organic polymer having silicon end group provided with hydrolyzable groups is finally synthesized by the reaction of isocyanate group of the obtained polymer of the first step with a special organo-silicon compound such as γ-aminoproply trimethoxy silane. This final product is useful as a sealing material of the single component type. The product has functional groups at both ends of each molecule, which are very sensitive to the atmospheric moisture and easily changed by hydrolysis to hydroxyl groups which are capable of rapid condensation reaction between them to produce vulcanized polymer.

However, in Method B, disadvantagesouly, since such expensive starting materials as isocyanate and γ-aminopropyl trimethoxy silane are used for synthesis, the production cost of the polymer having silicon end group becomes unexpectedly high. It is generally necessary to have a molecular weight of the main chain in an organic polymer of more than 10,000 to obtain a sufficient elongation of the resulting polymer vulcanized by polycondensation between the hydroxyl groups attached to the silicon end groups in the organic polymer having silicon end groups. In order to increase the molecular weight of the polymer having hydroxyl end group to that sufficient weight, as a starting material for the synthesis, it is convenient to combine the polymer molecules through urethane linkages by reaction with an isocyanate compound. Generally, since the molecular weight of a polymer having hydroxyl end group is about 2,000 at the highest, the polymer having an enhanced molecular weight of more than 10,000 obtained by the reaction with an isocyanate compound should have many urethane linkages in each molecule. As is well known, since the urethane linkage has a strong tendency to make a hydrogen bond intermolecularly, the viscosity of the obtained polymer in Method B, is so high that handling of the polymer becomes difficult and inconvenient. Furthermore, since the viscosity of the polymer is so high, it becomes impossible to mix in a large amount of fillers which are cheaper material and which reduce the cost of sealing materials. Also, since there exist many urethane linkages in the polymer, other problems involving thermal stability and mechanical property arise. For example, a sealed article with a sealing material obtained by Method B become impossible to use afterwards when heated in an oven at or above 120°C. Furthermore, although the mechanical strength of the vulcanized polymer is sufficiently large for practical use, its elongation is too small. This latter property produces a great disadvantage to the polymer obtained by the method B when used as a sealing agent. If a vulcanized sealing material has only a small breaking elongation, even though it has a large mechanical strength, it has a tendency to separate rather easily from a surface of adhered article or sometimes the adhered article itself will break.

In Method A, a polymer having hydroxyl end group, such as polyether polyol or polyester polyol is used as starting material for synthesis. First, a polymer having olefine end group is bonded to main chain through urethane linkage, and in the next step an organic polymer having silicon end group is synthesized by the reaction of the polymer having olefine end group with a silicon hydride compound in the presence of a platinum catalyst.

One typical example of the methods used for preparing polymers having an olefine end group bonded through urethane linkage, involves reacting a polymer having hydroxyl end group with allyl isocyanate. In the method, first, an isocyanate compound, such as toluene diisocyanate is reacted to a polymer having hydroxyl end group to derive a polymer having isocyanate end group. Then, finally, a compound such as allyl alcohol is reacted to the isocyanate end group. Therefore, the polymer having an olefine end group prepared by the method of A has at least two urethane linkages per one molecule and moreover has active hydrogens originated from nitrogen-hydrogen bonds in the molecule. In Method A, the organic polymer having silicon end group is further synthesized by hydrosilylation of the polymer with a silicon hydride.

There is a problem to this reaction. The silicon hydride adds to the olefine linkage and reacts with active hydrogen existing in the urethane linkage and is consumed. Especially, when a halo-silane compound, which is relatively inexpensive and has high reactivity, such as dimethyl chlorosilane or trichlorosilane, is used, very rapid reaction between the halosilane compound and the urethane linkage in the polymer occurs. Accordingly, the desired reaction of hydrosilylation is almost hindered. Therefore, practically, the halogenated silicon hydride cannot be used in this synthesis. A silicon hydride not containing halogen atoms, such as methyl dimethoxy silane or methyl diacetoxyl silane, etc, should instead, be used. The cost for production of a polymer having such silicon end group is high, since the price of the silicon hydride is high. Moreover, disadvantageously, it is necessary to use a large amount of special platinum catalyst of high cost for hydrosilylation in order to increase the reaction velocity for addition of the silicon hydride to olefine end group.

Furthermore, although polyoxypropylene glycol is mainly used as a starting material in Method A, from the standpoint of production of polyoxypropylene glycol itself, the molecular weight of polyoxypropylene glycol should be restricted to within 3,000 at the highest, in order to obtain a polymer having two hydroxyl groups at both ends of each molecule. Accordingly, it is necessary to use such a polyoxypropylene glycol of low molecular weight of 3,000 at the highest, as a starting material of Method A.

This produces a polymer of low molecular weight, having silicon end group, in Method A. As already mentioned, the breaking elongation of the cured polymer resulting from such a polymer of low molecular weight (lower than 3,000) is very small. Accordingly, and practically, the polymer produced by Method A can be hardly used as a sealing material.

As discussed above, the organic polymers having silicon end groups which have been proposed to data, have many disadvantages and as yet unsolved problems.

SUMMARY OF THE INVENTION

Accordingly, an object of the invention is to eliminate the foregoing and other deficiencies and disadvantages of the prior art.

This invention encompasses a polyether having silicon end group, produced by hydrosilylation of olefine end group of a polymer with silicon hydride in tthe presence of platinum catalyst, and wherein the main chain of the polymer used for the present invention, consists essentially of ether linkages of high degree of polymerization and each molecule has terminal olefinically unsaturated ether linkages. The polymer of the present invention consists essentially of ether linkages and does not contain any other linkages such as urethane linkages which are so reactive to silicon hydride and adversely affects the addition reaction of silicon hydride to olefine group in the polymer. Accordingly, the addition reaction can be effectively carried out rapidly in the present invention. Especially, since it is possible to use an inexpensive and highly reactive halosilane, such as methyl dichlorosilane or trichlorosilane as a reaction component for hydrosilylation of olefine group, the present invention has a distinct advantage over any conventional method from the standpoint of production cost.

Furthermore, since the polymer having silicon end group, as prepared by the method of the present invention, has no active group for forming hydrogen bond intermolecularly, such as the urethane group as already mentioned, the viscosity of the obtained polymer itself of the present invention is relatively low. This makes possible the mixing in of a large amount of fillers to improve the property as a sealing material. Furthermore, since the polymer of the present invention has no urethane group in its molecular structure, a fatal defect which exists in prior art selaing materials of the single component type, namely, that the breaking elongation of the cured polymer is too small, is remarkably and unexpectedly improved by this invention. Thus, the sealing agent of this invention, can be applied to seal or adhere any brittle article since the sealed article can be used normally without any crack or destruction. Accordingly, the polymer having silicon end group developed by the present invention can be used in various fields as a sealing materail or an adhesive. Moreover, the polymer has superior properties of thermal stability and adhesion etc.

DETAILED DESCRIPTION OF PREFERRED EMBODIMENTS

The present invention encompasses a polyether having a silylether group at each end of each molecule, as is shown by the following general formula:

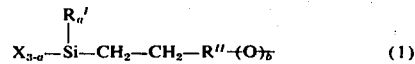
(1)

The structure of the main chain of the polyether can be shown by the chemically combined following structure unit:

(2)

wherein X is a group chosen from halogen group, alkoxy group, acyloxyl group, ketoximato group, amino group, amide group, aminoxy group, and mercaptide group; $R'$ is a monovalent hydrocarbon group, $R''$ is a divalent group chosen from $-CH_2-$,

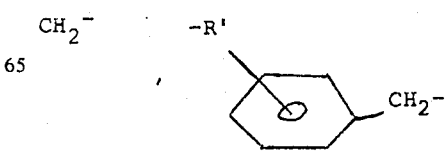

and —R'—OCH$_2$— (wherein R' is a divalent hydrocarbon group chosen from alkylene group, cycloalkylene group arylene group and aralkylene group); R''' is a divalent alkylene group having 2 to 4 carbon atoms, is a positive integer from zero to two (i.e. 0, 1 or 2) and b is also a positive integer from zero to one (i.e. 0 or 1).

The polyether having a silyl ether group at each end of each molecule and shown in general formula (1), can be produced by addition reaction of a silicon hydride shown by the general formula:

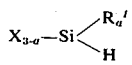  (3)

to a polyether having an olefinic ether group at each end of each molecule as shown by the following general formula:

$$CH_2 = CH-R'' -(O)_b- \qquad (4)$$

The polyether of the invention has the structural unit essentially shown in the chemical formula (2). The polyether can be produced from ethylene oxide, propylene oxide, butylene oxide or tetrahydrofuran as a raw material, by a cataionic polymerization or by an anionic polymerization. As the structural unit shown by the general chemical formula (2), practical examples are —CH$_2$—CH$_2$O—,

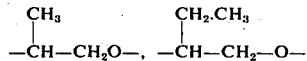

and —CH$_2$CH$_2$CH$_2$CH$_2$O—, etc. For the polyether used in the invention, any one or a mixture of two or more of the foregoing may be selected. Practically, it is desirable to use a polyether which can be produced from propylene oxide as a starting material. As the molecular weight of polyether, any one whose molecular weight is between 500 to 15,000 can be used. However, a polyether whose molecular weight is between 3,000 to 12,000 is most desirable.

The polyether having an olefinic group at each end of each molecule as shown in formula (4) can be produced, finally, by a reaction with the polyether with an organic halo organic compound shown by the general formula:

$$CH_2 = CH-R''-Y \qquad (5)$$

The following exemplary procedure may be used in this invention.

a. A hydroxyl end group which exists in polyoxyl alkylene polyol, such as polyoxypropylene glycol, polyoxy ethylene glycol and polyoxyl tetramethylene glycol, etc, is at first, converted into metallic alkoxide group using an alkali metal, such as Na or K, or using a metallic hydride, such as NaH, or using a metallic alkoxide, such as NaOCH$_3$, or using caustic alkali, such as NaOH or KOH. Then, obtained metallic alkoxide group is again converted into olefinic ether group by reacting a halo-organic compound shown in the formula (5). A polyether having an olefinic ether group at each end of each molecule and whose molecular weight is almost the same as that of polyoxy alkylene glycol used as a starting material, can be obtained. However, if a polyether of higher molecular weight is desired to be obtained, it is possible to obtain it from the polyoxyalkylene glycol used as a starging material, by increasing its molecular weight. That is, in the above synthesis procedure, before the addition of the halo-organic compound (5), a halo-organic compound which contains at least two halogen atoms in a molecule, such as methylene chloride, bis-(chloro-methyl)-benzene or bis-(chloro-methyl)-ether, is reacted with the polyether dialcoholate. The increase of molecular weight of the polyether di-alcoholate occurs and then finally the halo-organic compound (5) is reacted to obtain a polyether of high molecular weight having an olefinic ether group at each end of each molecule.

The above mentioned synthesis procedure may be illustrated in the following reaction diagram when the mentioned reagents are used. That is, metallic Na as the agent for converting hydroxyl group into alkoxide group, allylchloride as the halo-organic compound (5) and methylene chloride as the halo-organic compound containing at least two halogen atoms in a molecule.

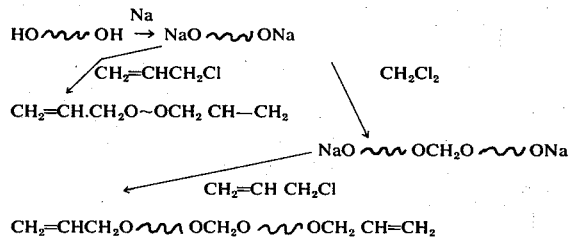

b. Polymerization of alkylene oxide, such as etherylene oxide and/or propylene oxide, etc., may be carried out using a caustic alkali, such as caustic soda or caustic potash, as a ploymerization catalyst in the presence of alcohol, such as allyl alcohol, propylene glycol, trimethylol propane, etc. In this polymerization, ordinarily, the caustic alkali used as a catalyst is used in an amount of 0.1 to 1.0 weight percent to the alkylene oxide to be polymerized, and the temperature of polymerization is from 80 to 160°C. Although the polymer of alkylene oxide thus obtained has a small amount of olefinic ether linkages at its molecular ends, almost all of its molecules have a hydroxyl group at each molecular end.

The hydroxyl end group existing in polyether thus obtained is converted into alkoxide group as explained in step (a) hereinabove, using any one of the mentioned reagents and successively reacting with an haloorganic compound (5) to produce an olefinic ether group at each end of each molecule. Of course, it is possible, if desired, to enhance the molecular weight of the polyether as explained in step (a) hereinabove, using an haloorganic compound which has at least two halogen atoms in a molecule.

c. Polymerization of an alkylene oxide such as propylene oxide, etc, is carried out at a low temperature, using a caustic potash as a catalyst and in the presence of alcohol, such as allyl alcohol, propylene glycol, trimethylol propane, etc. In this polymerization, the caustic potash, used as a catalyst, is used in an amount of 3 to 20 weight percent to the alkylene oxide to be polymerized and the temperature of polymerization is retained low such as 20° to 70°C. The degree of polymerization obtained in this low temperature polymerization is much larger than that of the polymer obtained in step (b) hereinabove. The polyether obtained in this polymerization reaction system can be converted successively into a polymer having two olefinic ether groups at both ends of a molecule easily by the reaction with an haloorganic compound (5) or its degree of polymerization can be enhanced by reaction with an haloorganic compound having at least two halogen atoms in a molecule in the manner mentioned before.

In the haloorganic compound shown by formula (5), Y is a halogen atom selected from chlorine, bromine, and iodine; and $R''$ is a divalent group selected from —$CH_2$—,

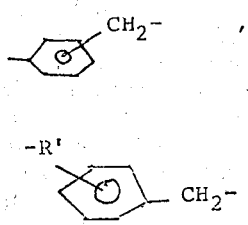

and —$R^1$—$OCH_2$— ($R'$ is the same as discussed before). Practical examples of such organo-halogen compounds are allyl chloride allyl bromide, vinyl-(chloromethyl)-benzene, allyl-(chloromethyl)-benzene, allyl-(bromomethyl)-benzene, allyl-(chloromethyl)-ether, allyl-(chloromethoxy)-benzene, 1-butenyl(choromethyl)-ether, 1-hecenyl(chloromethoxy)-benzene, etc. Among them, allyl chloride is preferred since it is relatively inexpensive and reactive.

In the silicon hydride shown in the general formula (3), $R'$ is a monovalent hydrocarbon group selected from alkyl group and aryl group. Practical examples of the silicon hydride are halosilane tri-chlorosilane, methyl dichlorosilane, dimethyl chlorosilane, and phenyl dichlorosilane; alkoxy silanes, such as trimethyoxy silane, tri-ethoxy silane, methyl di-ethoxy silane, methyl di-methoxy silane and phenyl-di-methoxy silane; acyloxy silanes, such as methyl di-acetoxy silane and phenyl diacetoxy silane; and ketoximato silanes, such as bis-(dimethyl-ketoximate)-methyl silane and bis-(cyclohexyl ketoximate)methyl silane. Among them, halosilanes and alkoxyl silanes are preferred.

The polymer having two halosilicon end groups in a molecule obtained by the reaction with halosilanes loses its halogen atoms easily by hydrolysis thereby generating hydrochloric acid gas, when it is exposed to atmospheric moisture. This causes polycondensation reaction curing rapidly at room temperature. If the generation of hydrogen chloride gas during the curing reaction is a problem for one reason or another, the halogen may be converted into hydrolyzable group after the hydrosilylation reaction. Examples of such exchangable hydrolyzable group are alkoxy group, acyloxy group, ketoximato group, amino group, amide group, aminoxy group and mercaptide group. Various synthesis treatments can be applied to exchange the halogen group with any one of those hydrolyzable groups. Practical examples will be shown for the replacement of halogen group with alkoxy group.

Those are reactions of a halogen group with (1) alcohol or phenol such as methanol, ethanol, 2-methoxylethanol and phenol, (2) sodium, potassium or lithium alkoxide of alcohol or phenol, (3) orthoformic acid ester such as ortho formic acid methyl ester and ortho formic acid ethyl ester and (4) epoxy compound such as ethylene oxide, propylene and allyl glycidyl ether. Especially among them, reaction of halogen group with a mixture of reagents such as shown in (1), such as alcohols and phenols and those shown in (3) such as ortho-formic acid esters, or a reaction with a combination of reagents such as shown in (1) and (4), such as alcohols, phenols and epoxy compounds, are preferred, since those reactions can be carried out smoothly to obtain a desirable result.

Furthermore, if a reaction of halogen group with a combination of reagents consisting essentially of carboxylic acids such as acetic acid and propionic acid, hydroxyl amines, such as N,N-dimethyl hydroxyl amine and N,N-diethyl hydroxyl amine, primary and secondary amines such as N,N-dimethyl amine, N,N-diethyl amine and pyrrolidine, acid amides which have at least one hydrogen atom on the nitrogen atom such as acetamide and formamide, ketoximes, such as acetoxime and methyl ethyl ketoxime, mercatans, such as n-octyl mercaptan and t-butyl mercaptan, and ortho formic acid esters or epoxy compounds, is carried out, it is possible to replace halogen groups partly with acyloxy group, amioxy group, amino group, amide group, ketoximato group and mercaptide group, and the remainder can be replaced with alkoxide group which is derived from ortho formic acid ester or from epoxy compounds.

In the present invention, in order to carry out the addition reaction of silicon hydride shown in general formula (3) to olefinic ether group situated at the molecular end shown in the general formula (4), it is necessary to use a catalyst. Any known catalyst for hydrosilylation may be used. Preferred is a platinum containing catalyst, such as chloroplatinic acid, metallic platinum, active carbon impregnated with platinum, platinum olefine complex, etc. The hydrosilylation may be carried out at any suitable temperature between 30° and 150°C, with temperatures between 60° and 120°C being especially preferable. Although use of a solvent in this reaction is not necessary, in case solvents are used, inert solvents, such as ethers, aliphatic hydrocarbons, aromatic hydrocarbons and halogenated hydrocarbons are preferred.

The polyether having silicon end group of this invention rapidly changes its state into a solid body having rubbery elasticity when exposed to atmospheric moisture, producing a polycondensation reaction and thus forming a three dimensional network structure. The chemical mechanism of this hardening phenomenon appears to operate in the following manner. The hydrolyzable group X shown in formula (1) is an active group to atmospheric moisture and is easily decomposed by moisture to hydroxyl group. Here,

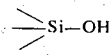

end groups appear at ends of the molecules of the polyether having silicon end group and the condensation reaction between

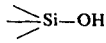

groups begins to occur, forming siloxane bonds

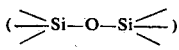

or increasing the molecular weight of the polymer until it vulcanizes at room temperature. This is a general description of the curing reaction. However, a condensation reaction between

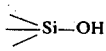

group generated by the hydrolysis and

itself will surely occur generating HX as a byproduct and, operate to cure the polymer. Accordingly, the curing velocity of the polyether having silicon end group depends upon the atmospheric temperature, relative humidity and the kind of X. Therefore, X, which is a hydrolyzable group should be selected with sufficient consideration of purpose of use as a sealing material or adhesive. Although as previously discussed, various groups may be used as X, among them, alkoxy group is preferred.

The silicon terminated polymer thus prepared has a molecular weight of between 500 to 15,000 and in the usual case, the viscosity is between 100 cps to 200,000 cps at 15°C.

The polyether having silicon end group of this invention should be kept in an anhydrous state and out of contact with water until ready for use.

The inventive polyether does not always need a curing accelerator. However, if such accelerator is used, some examples of accelerators which may be used are alkyl titanate; organo-silicon titanate; metallic salt of carboxylic acid, such as stannous octate, dibutyl tin laurate and dibutyl tin maleate, etc; amine salt, such as dibutyl amine-2-ethyl hexoate; and other acidic or basic catalysts which are known to be effective for silanol condensation reaction. The amount of accelerator used for curing may range from 0.01 to 10 weight percent based on the amount of inventive polyether. In case the hydrolyzable group X is an alkoxy group, since the curing velocity of this kind of polymer is relatively slow, it is desirable to use an accelerator. For such a purpose, tin carboxylate is preferred, or a combination of tin carboxylate and amine is especially preferred.

The inventive polyether may be modified by the addition of various types of fillers, such as, for example, fillers which are effective to reinforce, such as fume silica, precipitated silica, silica aerogel and carbon black; fillers such as calcium carbonate, magnesium carbonate, diatomaceous earth, clay, talc, titanium oxide, ferric oxide and zince oxide, etc; and fibrous fillers, such as asbestos, glass fiber and other filaments. The foregoing fillers may be used singly or in combination of two or more. Among the foregoing, silica aerogel, carbon black, calcium carbonate, titanium oxide and zinc oxide are especially effective for improving such properties as stability in storage, adhesive capability, breaking elongation and mechanical strength of the hardened polymer. Calcium carbonate is especially preferred.

A plasticizer may also be used in combination with the above fillers. By using a plasticizer the breaking elongation may be made greater and enable larger amounts of fillers to be used. The plasticizer may be any of those known in the art for such use. Examples of plasticizers suitable for use in the invention are phthalic acid esters, such as dioctyl phthalate, butyl benzyl phthalate etc; phosphoric acid esters, such as tri-cresyl phosphate; and plasticizers belonging to epoxy compound group, such as epoxy soybean oil, aliphatic esters and chlorinated paraffin, etc. They may be used singly, or as a combination of two or more. Among them, phthalic acid esters and chlorinated paraffin are preferred.

In the present invention, the fillers and plasticizers are used mainly for modifying the inventive polyether. Other additives may also be used to produce different characteristics and properties. For example, there may be used adhesive power increasing agents, such as phenol resin and epoxy resin; modifiers belonging to the silicon resin series, such as polysiloxane having alkoxy group at both ends of the molecule; pigments, antioxidants and absorbers of ultra-violet rays, etc.

In the inventive process, the procedure for mixing of the fillers, plasticizers and additives may be carried out in any suitable and conventional manner. However, in order to obtain good stability during storage, it is preferred to dehydrate and dry up ever component sufficiently before mixing. Moreover, the mixing should be carried out without exposure to atmospheric moisture. By preliminarily mixing all components, a single component type of sealing material may be produced. It is possible, also, to divide the components into two systems before complete mixing and thus prepare a two component type of sealing material. When the sealing material is needed for use, the two components would then be mixed together.

The inventive polymer, advantageously, is very useful, for example, as an elastic sealant of the single component type having desirable curing ability at room temperature and can be effectively used for building construction, airplanes, ships, cars, roads, etc. Furthermore, the inventive polymer, solely or as assisted by use of a primer, can be effectively used broadly in various fields as a sealing material or as an adhesive, since the polymer has ability to adhere tightly to various materials, such as glass, porcelain, wood, metal and polymers, etc. Moreover, the inventive polymer may be used as packing material for foods, as an elastic material to be formed by casting and as a material for making models, etc.

The invention will now be more fully illustrated by the following actual examples, which example are not to be construed in any limiting manner.

EXAMPLE 1.

First, taking polyoxypropylene glycol (PPG) as a starting material, a series of polyethers, each having an olefinic ether group at each end of each molecule, as shown in the general formula (4), was prepared. That is, after placing 200 g of PPG having molecular weight of 2,000, into a flask with three necks of 1 liter capacity, and replacing the atmospheric air phase in the flask with nitrogen gas, reaction was carried out, at first, with an alkoxidation reagent (for example, alkali metal such as Na or K, alkali-metal hydride such as NaH, alkoxide of alkali-metal such as NaOCH₃ or caustic alkali such as KOH or NaOH) at a suitable temperature and for a suitable period. Then, the reaction product was derived into a compound shown by formula (4) by the reaction with a haloorganic compound shown by formula (5). In case of a polymer having a higher molecular weight than that of PPG, is desired, a haloorganic compound having at least two halogen atoms in a molecule, such as methylene chloride, methylene bromide or bis-(chloromethyl)-ether, was reacted with the reaction product obtained from PPG and the alkoxidation agent before the reaction of the haloorganic compound of formula (5) with it. Then, successively, the haloorganic compound (5) was reacted with it. A polymer of high molecular weight having two olefinic ether group at both ends of the molecule was obtained.

The reaction conditions for the foregoing synthesis procedures are listed in Table 1.

a hydrosilylation reaction was carried out at 90°C for 3 hours. A polymer having

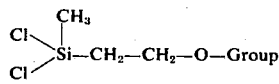

as a silyl ether end group was obtained. Then, successively, after decreasing the temperature of the content of the flask to 40°C, 40 g of a methanol solution of propylene oxide containing 30 mol % of methanol was added to react them with the compound having the silicon end group. After the reaction was continued for 3 hours at 40°C and further for 3 hours at 70°C, volatile components in the reaction mixture were distilled off and a polymer whose molecular weight was 4,400 and mostly having

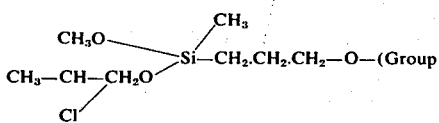

TABLE 1

SYNTHESIS METHOD OF POLYMER HAVING OLEFINIC ETHER END GROUP STARTING FROM PPG (MW = 2,000) [1]

| | | Alkoxidation reaction | | | Molecular weight increasing reaction | | | |
|---|---|---|---|---|---|---|---|---|
| Exp. No. | Reagent | Amount of reagent (mol) | Reaction temperature (°C) | Reaction time (hr) | Reagent | Amount of reagent (mol) | Reaction temperature (°C) | Reaction Time (hr) |
| 1 | K | 0.22 | 80 | 1 | — | — | — | — |
| 2 | K | 0.22 | 80 | 1 | CH₂Cl₂ | 0.05 | 60 | 1 |
| 3 | K | 0.22 | 80 | 1 | — | — | — | — |
| 4 | K | 0.22 | 80 | 1 | — | — | — | — |
| 5 | K | 0.22 | 80 | 1 | — | — | — | — |
| 6 | Na | 0.22 | 110 | 1 | ClCH₂OCH₂Cl | 0.05 | 80 | 1 |
| 7 [2] | NaOH | 0.40 | | | | | | |
| 8 | NaOH | 0.40 | 80 | 2 | ClCH₂OCH₂Cl | 0.05 | 100 | 3 |
| 9 | KOH | 0.40 | 80 | 2 | CH₂Cl₂ | 0.05 | 100 | 3 |

| | Olefinic etherification reaction at molecular chain end | | | | Polymer Obtained | |
|---|---|---|---|---|---|---|
| Exp. No. | Reagent | Amount of reagent (mol) | Reaction Temperature (°C) | Reaction Time (hr) | Molecular weight | Olefinic ether end group (%) |
| 1 | CH₂=CHCH₂Cl | 0.22 | 40 | 1 | 2080 | 99 |
| 2 | CH₂=CHCH₂Cl | 0.12 | 40 | 1 | 4090 | 99 |
| 3 | CH₂=CHCH₂—⟨O⟩—CH₂Cl | 0.3 | 70 | 2 | 2260 | 94 |
| 4 | CH₂=CHCH₂OCH₂Cl | 0.3 | 70 | 2 | 2140 | 98 |
| 5 | CH₂=CHCH₂—⟨O⟩—OCH₂Cl | 0.3 | 70 | 2 | 2290 | 98 |
| 6 | CH₂=CHCH₂Cl | 0.12 | 40 | 1 | 4120 | 99 |
| 7 [2] | CH₂=CHCH₂Cl | 0.3 | 80 | 6 | 2080 | 98 |
| 8 | CH₂=CHCH₂Cl | 0.2 | 80 | 6 | 4000 | 96 |
| 9 | CH₂=CHCH₂Cl | 0.2 | 80 | 6 | 4050 | 96 |

Remarks:
[1] 200 g of PPG, whose mean molecular weight was 2,000 was used.
[2] NaOH and CH₂ = CHCH₂Cl were charged at once into a reaction vessel and reacted.

Using various polymers shown in Table 1, various silyl ether groups were introduced at each end of the molecules. For example, 409 g (0.1 mol) of a purified polymer, whose molecular weight was 4090 and having an allyl ether group at each end of its molecule, which was prepared using conditions shown in Experiment No. 2 of Table 1, was placed into a pressure-proof reaction vessel and successively, 25.3 g (0.22 mol) of methyl dichlorosilane and 17 ml of a tetrahydrofuran solution of chloroplatinic acid (containing 0.01 g of chloroplatinic acid H₂PtCl₆.6H₂O and 0.1 ml of isopropanol) were added to it under a nitrogen stream and (a silyl ether group having one CH₃O-Group and one

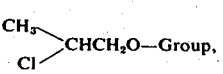

equi-molarly) as a silyl ether end group was obtained. The viscosity of the compound was about 2,000 cps. Test results were as follows: A compound prepared by mixing 100 weight parts of the obtained polymer with 2 weight parts of dibutyl tin laurate, 1 weight part of octyl amine and 1 weight part of antioxidant, showed no change when stored in a dried nitrogen atmosphere. When the sample was exposed to atmospheric air, it changed quickly and formed a tack-free skin on its surface after about 3 to 4 hours at ordinary (i.e. room) temperature. Further, a compound, prepared by mixing 100 weight parts of the obtained polymer with 15 weight parts of butyl benzyl phthalate, 20 weight parts of titanium oxide, 40 weight parts of calcium carbonate treated with fatty acid, 10 weight parts of carbon black, 1 weight part of an antioxidant, 2 weight parts of dibutyl tin laurate and 1 weight part of octyl amine, and using a 3-roll paint mill and poured on a polyethylene film, became tack-free after exposure to the atmosphere for 12 hours at ordinary temperature. After 14 days, a cured compound sheet of ca. 2 mm of thickness was obtained. It had the following properties: Shore hardness A, 32; Tensile strength, 8 kg/cm$^2$; Breaking elongation, 180%, etc.

EXAMPLE 2

In this example, a polymer whose viscosity was ca. 1,850 cps at 15°C and having

However, the sample became tack-free by exposure to air for 1 to 2 hours at ordinary temperature.

EXAMPLE 3

In Example 1,

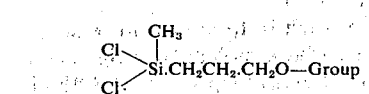

was derived by reaction of allyl ether group situated at the end of the molecular chain with methyl dichlorosilane and then the chlorine atoms bonded to the silicon atoms were exchanged with alkoxy groups, successively, by reacting a mixture of methanol and propylene oxide. However, there exists other synthesis methods for exchanging the chlorine atoms on the silicon atoms with other hydrolyzable groups. In Table 2, there are listed various hydrolyzable groups which can easily be derived onto the silicon atom to replace the chlorine atoms on it, wherein ortho-formic acid ester and epoxy compound was thus used in an excess of more than equi-molar ratio to the chlorine.

TABLE 2

| No. | Reagent System | Hydrolyzable Groups on silicon atom |
|---|---|---|
| 1. | $CH_3OH—CH(OCH_3)_3$ | $—OCH_3$ |
| 2. | $CH_3OH—CH_2\underset{O}{\overset{}{—}}CH_2$ | $\left(\begin{array}{l}—OCH_3 \text{ and} \\ —OCH_2CH_2Cl\end{array}\right.$ |
| 3. | $CH_3OH—CH_2\underset{O}{\overset{}{—}}CHCH_2OCH_2CH=CH_2$ | $\left(\begin{array}{l}—OCH_3 \text{ and} \\ —OCH_2CH(Cl)CH_2OCH_2CH=CH_2\end{array}\right.$ |
| 4. | ⌬OH—$CH_2\underset{O}{\overset{}{—}}CH—CH_3$ | $\left(\begin{array}{l}—⌬ \text{ and} \\ —OCH_2—CH(Cl)CH_3\end{array}\right.$ |
| 5. | $C_4H_9SH—CH(OCH_3)_3$ | $—SC_4H_9$ and $—OCH_3$ |
| 6. | $CH_3COOH—(CH(OCH_3)_3$ | $\left(\begin{array}{l}—O—\overset{O}{\overset{\|}{C}}—CH_3 \text{ and} \\ —OCH_3\end{array}\right.$ |
| 7. | $CH_3COOH—CH_2\underset{O}{\overset{}{—}}CH_2$ | $\left(\begin{array}{l}—O—\overset{O}{\overset{\|}{C}}—CH_3 \text{ and} \\ —OCH_2CH_2Cl\end{array}\right.$ |
| 8. | $\underset{CH_3}{\overset{CH_3}{>}}N—OH—CH_3—CH\underset{O}{\overset{}{—}}CH_2$ | $\left(\begin{array}{l}—O—N\underset{CH_3}{\overset{CH_3}{<}} \text{ and} \\ —OCH_2—CH(Cl)CH_3\end{array}\right.$ |
| 9. | $CH_3\overset{O}{\overset{\|}{C}}—NH_2—CH(OCH_3)_3$ | $\left(\begin{array}{l}—NH\overset{O}{\overset{\|}{C}}—CH_3 \text{ and} \\ —OCH_3\end{array}\right.$ |
| 10. | $\underset{CH_3}{\overset{CH_3}{>}}C=NOH—CH_3—CH\underset{O}{\overset{}{—}}CH_2$ | $\left(\begin{array}{l}—ON=C\underset{CH_3}{\overset{CH_3}{<}} \text{ and} \\ —OCH_2CH(Cl)CH_3\end{array}\right.$ |

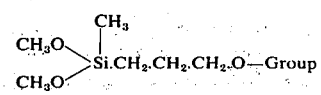

as a silyl ether end group, was prepared using the same conditions as in Example 1, except 23.3 g (0.22 mol) of methyl dimethoxy silane was used for hydrosilylation in place of methyl dichlorosilane of Example 1. Test results showed that a compound prepared from the obtained polymer, by mixing 2 weight parts of dibutyl tin laurate, 1 weight part of octyl amine and 1 weight part of an antioxidant and 100 weight parts of the obtained polymer, was very stable in an atmosphere having no moisture, for example in dry nitrogen atmosphere.

EXAMPLE 4

Placing 0.95 g of caustic potash of 85% purity, available on the commercial market, (0.95g of caustic potash means 0.90 g of KOH and 0.05 g of $H_2O$) into a pressure proof reaction vessel of 1 liter capacity with a stirrer and already replaced with nitrogen gas, and successively adding 1.64 g of 1,2-propane-diol and 464 g of propylene oxice, polymerization reaction was carried out at an elevated temperature of 100°C for 15 hours. A polymer whose mean molecular weight was 3,000 was obtained at 100% conversion. Since the end groups of this polymer were mostly hydroxyl group and allyl ether group, it was necessary to convert all end groups into olefinic ether group. This was done in the same was as in Example 1. That is, an alkoxidation reaction was carried out adding more than one mole of alkoxidizing agent per one mol of the hydroxyl end group (see Example 1) and successively an haloorganic compound was reacted with it.

A practicle example of such is, to the obtained solution of polyoxypropylene whose molecular weight was 3,000 and having hydroxyl end group in about 80% of the theoretical amount, 11.6 g of metallic potassium was added and the alkoxidation reaction was carried out at 80°C for 1 hour under sufficient agitation and then 24 g of allyl chloride was added to react with the alkoxy group at 40°C for 1 hour. A polymer whose mean molecular weight was 3040 and having an allyl ether group at each end of the molecule was synthesized. It is possible to synthesize a polymer having allyl ether end group, whose mean molecular weight is much higher than the mentioned 3040. In that case, 6.6 g of methylene chloride was added to the alkoxidized polymer system before the addition of the allyl chloride to react with the polymer having alkoxy end group, and afterwards, 12 g of allychloride was added to the reaction system to react with alkoxy group at 40°C for 2 hours. A polymer having allyl ether end group whose molecular weight was 6050 was thus obtained. The polymer purified by filtration.

Using 605 g (0.1 mol) of the polymer having mean molecular weight of 6050, in place of 409 g (0.1 mol) of the polymer of mean molecular weight of 4090 used in Example 1, and performing the reactions, such as hydrosilylation with methyl dichlorosilane and alkoxidation reaction with a mixture of methanol and propylene oxide, using the same conditions as in Example 1, there was obtained a polymer having

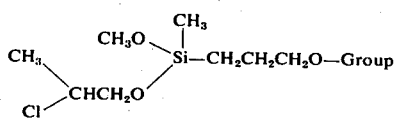

as a silyl ether end group and having 6,300 mean molecular weight. The viscosity of the obtained polymer was 8,000 cops at 15°C. The results of tests on the polymer were as follows.

A compound prepared by mixing 100 weight parts of the polymer with 20 weight parts of chlorinated paraffin (content of chlorine, 40%), 20 weight parts of titanium oxide, 45 weight parts of calcium carbonate treated with lignin, 5 weight parts of carbon black, 3 weight parts of silica aerogel, 1 weight part of antioxidant, 2 weight parts of dibutyl tin maleate and 1 weight part of octyl amine, intimately mixed by a 3-roll paint mil and poured on a polyethylene film, became tack-free after exposure to atmospheric air at ordinary (i.e. as used herein ordinary means room) temperature for 10 hours. After exposure of 14 days, a cured compound sheet of about 2 mm thickness was obtained. It had the properties of Shore Hardness A, 26; Tensile strength, 10.6 kg/cm$^2$; Strength at 150% elongation, 6.6 kg/cm$^2$; and Breaking elongation, 310%.

EXAMPLE 5.

Placing 39.7 g of dehydrated and pulverized caustic potash of 99% purity (containing 39.3 g of KOH) into a pressure proof reaction vessel of 1.5 liter capacity, with a stirrer, and successively charging into it, 174 g of propylene oxide, 4 g of polyethylene glycol whose mean molecular weight was 200 as an initiator and 90 ml of n-hexane as a solvent, polymerization reaction was carried out at 40°C for 4 hours. Successively, while maintaining the temperature at the reaction zone at 40°C, a n-hexane solution of propylene oxide consisting of 407 g of propylene oxide and 210 ml of n-hexane was dropwisely charged gradually during a period of 12 hours to continue the polymerization reaction. With the end of the dropping charge of the solution, the temperature of the reaction mixture was elevated to 50°C and the reaction was continued for 2 hours. A solution of a polymer whose mean molecular weight was 5,000 was obtained at 100% converstion (the content of allyl ether end group in the polymer was about 30% of the theoretical amount). Of course, the polymer could be introduced to a polymer which contains an olefinic ether group shown by the general formula (4) at each end of each molecule, by the reaction with a haloorganic cmound shown by formula (5).

Further, when it was desired to obtain a polymer of higher molecular weight, before the reaction with the haloorganic compound of formula (5), the polymer solution containing a large amount of casutic potash was reacted with a haloorganic compound having at least 2 halogen atoms in a molecule, such as for example, methylene chloride, bis-(chloromethyl)-ether, etc. Then, successively, the haloorganic compound shown by the formula (5) was reacted. The reaction condition for obtaining a polymer having olefinic ether end group shown by formula (4) by reaction of the polymer solution with the haloorganic compound shown by formula (5) and the properties of the obtained polymer are shown in Table 3.

TABLE 3 [1]

Remarks:
[1] The reaction carried out in the polymer solution prepared under conditions of Example 5 and contained 0.117 mol of the polymer.

Placing 802 g (0.1 mol) of purified polymer having an allyl ether group at each end of its molecule (prepared by the method shown in No. 3 of Table 3) into a pressure-proof reaction vessel with a stirrer, replaced with nitrogen gas, and successively, 25.3 g (0.22 mol) of methyl dichlorosilane and 17 ml of an isopropanol-tetrahydrofuran solution of chloroplatinic acid (containing 0.01 gram of chloro platinic acid $H_2PtCl_6 \cdot 6H_2O$ and 0.1 ml of isopropanol), were added to it under nitrogen stream and the content within the reaction vessel was heated up to 90°C to initiate reaction.

A polymer having

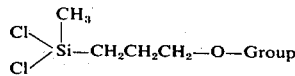

as a silyl ether end group was obtained. Decreasing the temperature of the reaction mixture to 40°C and adding 40 g of a methanol solution of propylene oxide containing 30 mol percent of methanol, an alkoxidation reaction was carried out for 3 hours and the reaction was continued for a further 3 hours at an elevated temperature of 70°C. Distilling off the volatile matter, a polymer whose molecular weight was 8,300 and having mostly

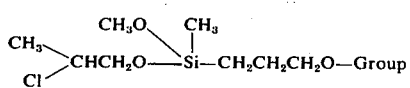

(The polymer had $CH_3O-$ and

almost equi-molarly) as a silyl ether end group was obtained. The viscosity of this polymer was about 21,000 cps at 15°C. A compound prepared by mixing 1 weight part of dibutyl tin phthalate, 1 weight part of octyl amine and 1 weight part of an antioxidant to 100 weight parts of the obtained polymer showed no change when stored in a dry nitrogen atmosphere for several months. However, when it was exposed to the atmospheric air, it changed rapidly and became tack-free after 3 to 4 hours, forming a skin on its surface. Various kinds of sheets of about 2 mm thickness were prepared to examine those mechanical properties, curing various compounds cast on polyethylene films at room temperature, wherein those compounds were prepared by mixing the obtained polymer with various fillers and plasticizers using a 3-roll paint mil. The results are shown in Table 4.

TABLE 4

| No. | Composition[1] of compound (weight parts) | Hardness Shore A | Elongation (%) | Properties of cured sheet [5] Modulus 150% elongation (kg/cm²) | Tensile Strength (kg/cm²) |
|---|---|---|---|---|---|
| 1. | Chlorinated paraffin [2] 25; $TiO_2$,20; Carbon black,5; $CaCO_3$, 40; silica aerogel, [3] | 22 | 380 | 4.8 | 10 |
| 2 | Chlorinated paraffin, 25; $CaCO_3$, 40; $TiO_2$,20; carbon black, 5; silica aerogel,3; KR-213 [4],2 | 15 | 660 | 3.1 | 11 |
| 3 | Butyl benzyl phthalate,25; $CaCO_3$, 50; silica aerogel, 10 | 24 | 420 | 5.2 | 10 |
| 4 | Carbon black,35; KR-213, 2 | 45 | 580 | — | 86 |
| 5 | Tricresyl phosphate, 20; $CaCO_3$, 30; Carbon Black, 20 | 30 | 460 | 6.3 | 16 |

Remarks:
[1] Other common composition components are not listed in Table 4 and are 100 parts of polymer; 1 part of dibutyl tin maleate, 1 part of octyl amine and 1 part of an antioxidant, each in terms of weight.
[2] The content of chlorine was 40%.
[3] The calcium carbonate was treated with lignin on its surface.
[4] This is the commercial name of a polysiloxane having methoxy groups at each end of each molecule, and is produced by Shinetsu Chemical & Industrial Corp.
[5] Mechanical properties were observed after curing for 14 days at an ordinary temperature and the thickness of each sheet was about 2 mm.

EXAMPLE 6

Using the cured sheet shown as No. 2 in Table 4 of Example 5, its thermal stability and waterproof properties were examined. The sheet was exposed to a hot atmospheric air in an oven maintained at 100°C for 10 days and then its mechanical properties were observed. Those results were: Shore Hardness A, 14; Breaking elongation, 550%; Modulus at 150% elongation, 3.6 kg/cm²; and Tensile Strength, 10 kg/cm². For the waterproof test, the sample was immersed in a water of 50°C for 7 days and then mechanical properties were observed. The results were: Shore hardness A, 15; Breaking elongation, 680%; modulus at 150% elongation, 3.0 kg/cm²; and Tensile strength, 12 kg/cm².

The foregoing description is intended to be illustrative of the principles of the invention. Numerous other variations and modifications thereof would be apparent to the worker skilled in the art. All such variations and modifications are to be considered to be within the spirit and scope of the invention.

What is claimed is:

1. A composition comprising a polyether consisting essentially of chemically combined units of the formula —R'''—O—, having a molecular weight of between 500 to 15,000, and terminal silylether groups of the formula

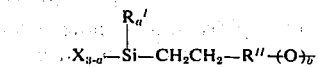

wherein R' is an alkyl or aryl radical having from 1 to 12 carbon atoms, —R''—, is a member selected from the group consisting of —CH$_2$—,

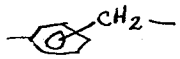

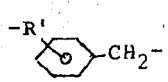

and —R'—OCH$_2$—, wherein R' is a divalent hydrocarbon radical having 1 to 12 carbon atoms and selected from the group consisting of alkylene radicals, cycloalkylene radicals, arylene radicals and aralkylene radicals; —R— is a divalent alkylene radical selected from the group consisting of —CH$_2$CH$_2$—,

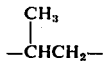

and —CH$_2$CH$_2$CH$_2$CH$_2$—, X is a member selected from the class consisting of halogen radicals, alkoxy radicals, acyloxy radicals, ketoximato radicals, amino radicals, amide radicals and mercaptide radicals; $a$ is a whole number equal to 0, 1 or 2 and $b$ is a whole number equal to 0 to 1.

2. The composition of claim 1, wherein the polyether is a propylene polyether having a molecular weight between 3,000 to 12,000.

3. The composition of claim 1, wherein X is a radical of alkoxy radical, acyloxy radical or ketoximato radical.

4. The composition of claim 2, wherein the alkoxy radical a member selected from the group consisting of CH$_3$O—,

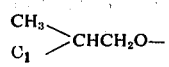

and ClCH$_2$CH$_2$O—.

5. The composition of claim 1, wherein R'' is —CH$_2$—.

6. The composition of claim 1, wherein said polyether is admixed with a filler.

7. The composition of claim 6, wherein said filler is selected from the group consisting of silica aerogel, carbon black, calcium carbonate, titanium oxide, zinc oxide and mixtures of the foregoing.

8. The composition of claim 1, wherein said polyether is admixed with a silanol condensation catalyst in an amount sufficient to cure said composition upon exposure to moisture.

9. The composition of claim 8, wherein said polyether is admixed with a filler.

10. The composition of claim 9, wherein said polyether is further admixed with a plasticizer.

11. The composition of claim 1 subjected to curing.
12. The composition of claim 2, subjected to curing.
13. The composition of claim 3, subjected to curing.
14. The composition of claim 4, subjected to curing.
15. The composition of claim 5, subjected to curing.
16. The composition of claim 6, subjected to curing.
17. The composition of claim 7, subjected to curing.
18. The composition of claim 8, subjected to curing.
19. The composition of claim 9, subjected to curing.
20. The composition of claim 10, subjected to curing.

* * * * *